Patented July 15, 1941

2,249,512

UNITED STATES PATENT OFFICE 2,249,512

MANUFACTURE OF TETRACHLORETHYLENE

Josef Wimmer, Burghausen, and Martin Mugdan, Munich-Grosshesselohe, Germany, assignors to Consortium fur Elektrochemische Industrie G. m. b. H., Munich, Germany, a corporation of Germany No Drawing. Application August 1, 1938, Serial No. 222,564. In Germany August 10, 1937

2 Claims. (Cl. 260—654)

This application relates to the manufacture of tetrachlorethylene, a chemical compound having the formula $CCl_2=CCl_2$. More particularly, it relates to the manufacture of tetrachlorethylene from pentachlorethane by a continuous method.

The conversion of pentachlorethane to tetrachlorethylene by heating the pentachlorethane in the presence of aluminum chloride as a catalyst is already known in the chemical art. However, when pentachlorethane is heated with aluminum chloride as a catalyst for several hours a substantial amount of the catalyst deposits as a crust-like coating in the apparatus. Obviously the catalyst is ineffective under these conditions and the process is seriously interfered with. When the product of the reaction is subsequently distilled during its recovery a substantial part of the aluminum chloride distills over with the product, thus further encrusting the apparatus and increasing the impurities present in the desired product.

It has now been found that these disadvantages are entirely eliminated and there is also secured a substantial saving in the amount of catalyst necessary, accompanied by better utilization of the reaction space, by employing a simple continuous method of preparation leading directly to a very pure product. Accordingly, it is one of the objects of this invention to prepare tetrachlorethylene from pentachlorethane by heating the latter in the presence of aluminum chloride by continuous methods wherein a product of a high degree of purity is obtained. Other objects of this invention are the elimination of wastage of catalyst as the result of encrustation of portions of the apparatus, as well as better and more efficient utilization of the reaction space. These and still other objects of this invention will be apparent from the ensuing disclosure of a preferred embodiment thereof.

The reaction apparatus preferably comprises a flask which can be heated to which is attached a fractionation column. The flask is filled to a desired level with pentachlorethane or, preferably, with tetrachlorethylene. A small amount of aluminum chloride (substantially 1.5%) is then placed in the flask. Pentachlorethane is continuously passed into the flask which is meanwhile heated to the boiling temperature. The rate of heating and reflux are so regulated that pure tetrachlorethylene and hydrogen chloride gas escape from the dephlegmator. The rate of pentachlorethane addition is so regulated that the level of liquid is maintained substantially constant in the flask.

Operating in accordance with this procedure, no aluminum chloride deposits occur in the column. The tetrachlorethylene secured is almost substantially free of aluminum chloride. The concentration of the aluminum chloride is maintained substantially constant in the flask and the catalyst remains active as it is not contaminated by the small amounts of impurities, such as water, which are normally present. The reaction is much more rapid than the batch methods known to the prior art and better utilization of the reaction space and catalyst, as compared with the older processes, is secured.

As an example of the improved method for the continuous manufacture of tetrachlorethylene from pentachlorethane the following may be given:

*Example*

16 kg. of tetrachlorethylene and 0.5 kg. of aluminum chloride were placed in a flask having a capacity of 20 liters. There was attached to this flask a fractionating column provided with a dephlegmator. The flask was heated until boiling occurred. Thereupon, pentachlorethane at the rate of 70 kg. per hour was continuously introduced in a uniform stream into the flask. The resulting tetrachlorethylene passed over together with the hydrogen chloride in a state almost substantially free from aluminum chloride catalyst. At the start of operations the temperature of the flask was substantially 120° C.

After operation for some time, owing to a small amount of water present in the pentachlorethane or as a result of the presence of small amounts of other impurities a part of the catalyst became gradually decomposed. This retarded the reaction. The evolved stream of hydrogen chloride became less in quantity and pentachlorethane accumulated in the flask. This resulted in elevation of the temperature of the contents of the flask. When the contents of the flask reached a temperature of 130° C. after operation for approximately 3 hours additional aluminum chloride in the amount of 0.5 kg. was added. The evolution of hydrogen chloride and production of tetrachlorethylene commenced again at substantially the previous rate. The column was free from deposits of any of the material and no substantial loss in the amount of aluminum chloride present was observed.

In place of aluminum chloride, it is also possible to use metallic aluminum which is quickly converted to aluminum chloride by reaction with the pentachlorethane.

It should be understood that the foregoing details given as illustrative of the preferred embodiment of this improved process should not be regarded as restrictive but only as illustrative. As many changes may be made in the procedure as described, the invention is not to be limited to precise details of operation but is to be construed in accordance with the appended claims.

We claim:

1. A process for preparing tetrachlorethylene which comprises continuously introducing pentachlorethane into a liquid bath comprising essentially tetrachlorethylene, pentachlorethane and aluminum chloride as a catalyst, said bath being maintained at a temperature above the boiling point of tetrachlorethylene, and withdrawing the resulting tetrachlorethylene and evolved hydrogen chloride directly subsequent to their formation.

2. A process for the preparation of tetrachlorethylene which comprises continuously introducing pentachlorethane into a boiling mixture of tetrachlorethylene and aluminum chloride, the evolved tetrachlorethylene and hydrogen chloride being fractionated off directly subsequent to their formation.

JOSEF WIMMER.
MARTIN MUGDAN.